Dec. 26, 1939.  R. J. REYNOLDS  2,184,815
CAMERA CABLE RELEASE
Filed June 21, 1938
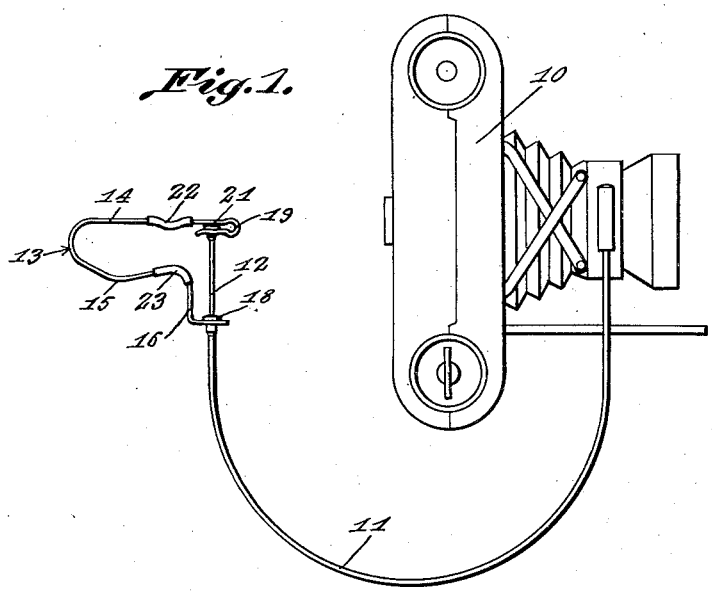
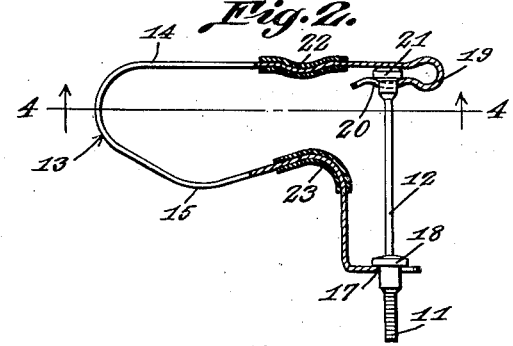
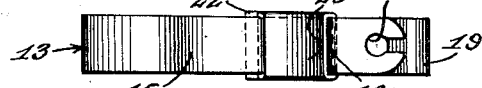
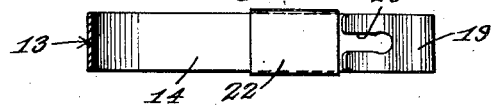
Robert J. Reynolds, INVENTOR
BY Victor J. Evans & Co.
ATTORNEYS Patented Dec. 26, 1939

2,184,815

UNITED STATES PATENT OFFICE 2,184,815

CAMERA CABLE RELEASE

Robert J. Reynolds, Trotwood, Ohio

Application June 21, 1938, Serial No. 214,988

1 Claim. (Cl. 74—501)

This invention relates to camera cable releases and has for an object to provide a camera cable release which is adapted to be operated by the photographer's mouth.

In the use of miniature cameras or any hand held camera it is imperative that no movement of the camera occur during the exposure. If camera movement does occur the negative will show a blurred image, the degree of blur corresponding to the amount of movement. Therefore, to secure a negative of sharp detail so that an enlargement can be made, the camera must not move during the time the shutter is open.

The miniature camera is often used at eye level. The shutter is released manually usually with the right index finger, and unless great care is exercised one is likely to move the camera at the instant the shutter is released. Bearing the above disadvantages in mind the present invention provides a resilient loop which is adapted to be held in the mouth, the upper and lower members of the loop being provided with rubber sleeves for engagement by the teeth, said members being connected respectively to the cable and to the cable wire of the shutter release so that upon the members being forced toward each other by closing the mouth the shutter will be operated while both hands of the operator are free to hold the camera rigid.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation of a camera equipped with a shutter release constructed in accordance with the invention.

Figure 2 is a longitudinal sectional view of the shutter release in applied position.

Figure 3 is a bottom plan view of the shutter release.

Figure 4 is a cross sectional view of the shutter release taken on the line 4—4 of Figure 2 and looking in the direction of the arrows.

Referring now to the drawing in which like characters of reference designate similar parts in the various views, 10 designates a conventional camera having the shutter operated by a conventional release cable 11 and wire 12 telescopically received in the cable.

In carrying out the invention a resilient wire loop 13 is provided, having upper and lower members 14 and 15 respectively. The lower member is extended and formed to provide an angular bracket 16 through the medium of which the loop is connected to the cable 11, and for this purpose the bracket is terminally provided with an opening 17, as shown in Figure 3, to receive the neck of the cable button 18. The upper member 14 of the loop is extended and bent upon itself to provide a spring catch 19, best shown in Figure 2, through the medium of which the loop is connected to the wire 12 of the cable release. For this purpose the end of the catch is slotted as shown at 20 to receive the neck of the button 21 of the wire, the resiliency of the free end of the catch holding the wire firmly against the upper member of the loop.

The loop is adapted to be held in the mouth and the upper and lower members of the loop are provided with respective rubber sleeves 22 and 23 for engagement by the teeth.

In operation the camera may be held at eye level while being focused upon the object, both hands being free to hold the camera. As heretofore stated the resilient loop 13 is held in the mouth with the rubber sleeves 22 and 23 engaged with the teeth. When the shutter is to be operated it is simply necessary to close the mouth thereby forcing the upper and lower members of the loop toward each other to telescope the wire 12 into the cable 11 and operate the shutter.

From the above description it is thought that the construction and operation of the invention will be fully understood without further explanation.

What is claimed is:

A mouth operated cable release for cameras comprising a resilient loop adapted to be held in the photographer's mouth and deformed by pressure of the teeth, the loop having upper and lower members, the lower member being formed to provide an angular bracket having an opening to receive the neck of a camera release cable button, the upper member being extended and bent upon itself to provide a slotted spring catch adapted to receive the release wire of said cable, and rubber sleeves on the upper and lower members adapted for engagement with the teeth of the photographer.

ROBERT J. REYNOLDS.